United States Patent [19]

Yasui

[11] Patent Number: 4,779,695
[45] Date of Patent: Oct. 25, 1988

[54] SNOWMOBILE SEAT CONSTRUCTION

[75] Inventor: Toshihiro Yasui, Coon Rapids, Minn.

[73] Assignee: Yamaha Hatsudoki Kabushiki Kaisha, Iwata, Japan

[21] Appl. No.: 498,830

[22] Filed: May 27, 1983

[51] Int. Cl.$^4$ ............................................. B62M 27/02
[52] U.S. Cl. ...................................... 180/190; 280/8; 297/383; 297/423
[58] Field of Search ............... 180/182, 186, 190, 216; D6/48.1; D12/7; 297/195, 243, 353, 383, 423, DIG. 9; 280/8, 9, 10, 11; 296/192

[56] References Cited

U.S. PATENT DOCUMENTS

| | | | |
|---|---|---|---|
| 3,369,629 | 2/1968 | Weiss | 180/216 X |
| 3,550,707 | 12/1970 | Lange | 180/190 |
| 3,658,358 | 4/1972 | Baker | 180/182 X |
| 3,680,882 | 8/1972 | Fleury | 180/182 X |
| 3,736,005 | 5/1973 | Wright | D12/7 X |
| 3,741,596 | 6/1973 | Cate | 297/DIG. 9 X |
| 3,783,958 | 1/1974 | Canavan | 180/184 |
| 3,822,917 | 7/1974 | George | 297/195 |
| 3,913,974 | 10/1975 | Bowen | 297/195 |
| 4,135,470 | 1/1979 | Ono | 180/190 X |

Primary Examiner—John J. Love
Assistant Examiner—Charles R. Watts
Attorney, Agent, or Firm—Orrin M. Haugen; Thomas J. Nikolai

[57] ABSTRACT

A snowmobile body having an improved seat construction for a snowmobile vehicle having a built-in backrest which is inclined at a small acute angle with respect to the vertical for providing support for the driver in the lumbar and thoracic regions when assuming a slightly reclining disposition. The seat back may be slidably adjustable relative to the frame of the vehicle and the steering wheel or handlebars use to control the front steering skis may also be adjustable to accommodate drivers of differing physical size.

4 Claims, 2 Drawing Sheets

SNOWMOBILE SEAT CONSTRUCTION

BACKGROUND OF THE INVENTION

1. Field of the Invention

This invention relates generally to snowmobile-type vehicles, and more specifically to a more comfortable seat construction in which the driver may lean rearward from a vertical seated position with his or her legs somewhat extended and elevated and with his or her back supported over a predetermined area.

2. Discussion of the Prior Art

Most prior art snowmobiles have an elongated bench-type seat construction with the cushion extending longitudinally with respect to the longitudinal axis of the vehicle's frame and the drivers straddle the cushion with their feet planted on generally horizontal running boards. As such, the operator is forced to assume a somewhat hunched-forward position which, after prolonged periods of operation, may cause discomfort to some individuals. Examples of such prior art snowmobile seat arrangements over which the present invention is deemed to be an improvement are shown in the Ishiyama U.S. Pat. No. Des. 264,830 which is assigned to the assignee of the present invention and in the Lange U.S. Pat. No. 3,550,707. While each of the aforementioned prior art patents show a seat construction terminating in a slightly turned-up tail-end portion, that portion does not extend upward sufficiently high to function as a backrest. Instead, those prior art turned-up seat ends are designed to keep the driver or a passenger from sliding rearward off of the end of the vehicle's seat under sudden acceleration conditions.

SUMMARY OF THE INVENTION

Through human engineering studies, it has been determined that more comfort to the driver results when support is provided to the back, especially when driving for prolonged periods of time. In accordance with the teachings of the present invention, there is provided a snowmobile-type vehicle having a frame supporting an engine and a transmission operatively connecting the engine to an endless track which is driven about an orbital path. The frame also supports steerable skis and a seat upon which the operator sits. Affixed to and extending upwardly and rearwardly at a predetermined angle of inclination from said seat is a seat back member which functions as a backrest for the operator. Rather than sitting vertically or slightly hunched forward with the feet planted on a horizontal running board, the footrests in the snowmobile of the present invention are positioned at a predetermined, upwardly-inclined, forward-sloping angle at a point out in front of the operator's knees. Because the feet and legs are, thus, slightly elevated, the operator's torso is naturally tilted rearward against the backrest which then supports the driver's back in the lumbar and thoracic regions.

Snowmobile vehicles have also been constructed in which the seat is provided with a backrest, but those vehicles have been of a type incorporating a body confining cockpit-like seating arrangement wherein the operator actually sits within rather than upon the vehicle. One such device of this type is manufactured and sold by Leisure Vehicles, Inc. of Troy, Mich., under the trademark "Raider". To applicant's knowledge, the present invention is the first in which a snowmobile of a more conventional design is provided with a backrest and is human engineered with respect to the elevation and location of the footrests so as to place the driver in a slightly laid-back position while driving the vehicle.

OBJECTS

It is accordingly a principal object of the present invention to provide a new and improved seat arrangement for a snowmobile-type vehicle.

Another object of the invention is to provide a seat construction for a snowmobile which incorporates a backrest member.

Yet another object of the invention is to provide a snowmobile vehicle of the type having a bench-like frame supporting a cowl having sloped footrests which are slightly elevated from the usual running board location and seat upon which the operator normally sits with his legs straddling same, the seat having a backrest portion which allows the operator to assume a comfortable position in which the legs are elevated and somewhat straight while the torso is inclined slightly rearward.

These and other objects and advantages of the invention will become apparent to those skilled in the art from the following detailed description of a preferred embodiment of the invention, especially when considered in connection with the accompanying drawings in which like numerals in the several views refer to corresponding parts.

DESCRIPTION OF THE PREFERRED EMBODIMENT

Figure 1:
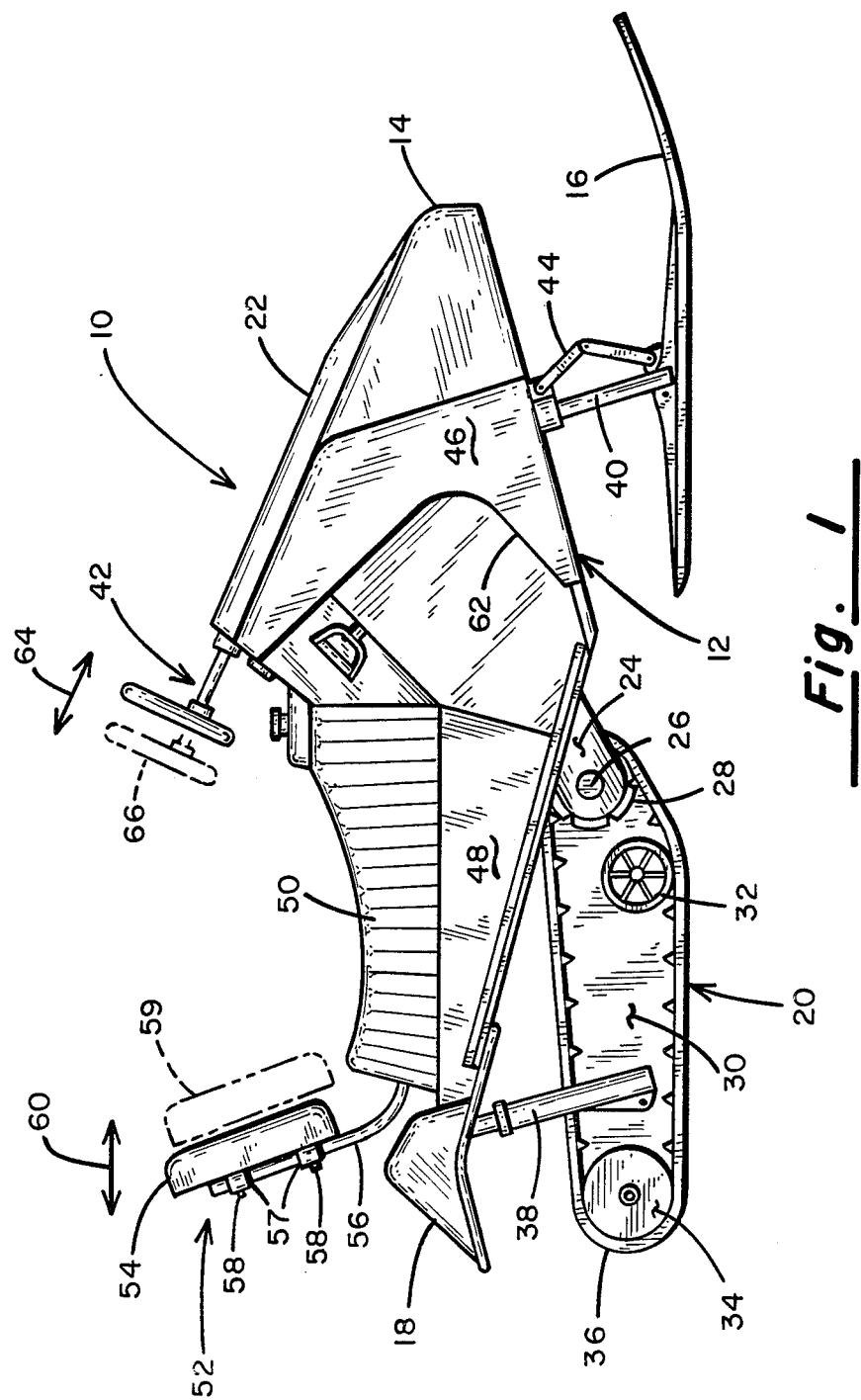
FIG. 1 is a side view of a snowmobile built in accordance with the present invention.

Referring to FIG. 1, a snowmobile-type vehicle is indicated generally by numeral 10 and is seen to include an undercarriage or frame 12 which is supported at its forward end 14 by a pair of steerable ski members 16—16 and at its rear end 18 by a track support system indicated generally by numeral 20.

Mounted on the frame 12 beneath the hood 22 is an engine (not shown) whose output shaft is coupled through a conventional centrifugal clutch arrangement to a jack shaft (not shown) which is journaled for rotation about an axis extending transverse to the longitudinal axis of the vehicle. This jack shaft has a chain sprocket thereon and an endless chain contained within the chain case 24 drives an axle 26 to which the track drive wheel 28 is secured. The shaft 26 passes transversely through an enclosed track support housing 30 and is journaled for rotation in the lower end of an arm member (not shown) whose other end is rotationally coupled to the opposite end of the jack shaft to which the chain case 24 is affixed. Idler wheels 32 and 34 are also rotationally mounted upon transversely extending axles passing through the track support housing 30. An endless track 36 passes about the drive sprocket 28, the idler wheels 32 and 34 such that the lower flight of the track engages the ground while the upper flight thereof is supported by the top surface of the enclosure 30.

Disposed between the enclosed track support housing 30 and the frame 12 on either side of the assembly 20 are shock absorbers 38. In that the chain case 24 is pivotally mounted at its upper end (not shown) to the end of the clutch-driven jack shaft, the suspension assembly 20 may move vertically without an attendant change in track tension. The pivoting arrangement of this suspension also permit full track-ground contact when the vehicle sways during a turning maneuver.

The front skis 16 may also be shock mounted in a conventional fashion to the frame by shock absorber assemblies 40 and a mechanism is provided for coupling a steering wheel/steering shaft assembly 42 to the skis (as through linkage 44) to permit them to be turned about a generally vertical axis.

The body of the snowmobile 10 may be fabricated from aluminum, fiberglass or other suitable plastic to provide a desirable aesthetic appearance and the body is seen to include the hood 22, a cowl 46 and a "tunnel" 48 into which the track support assembly 20 may be recessed when the vehicle is under heavy load or subjected to shock condition. Resting on top of the tunnel 48 is a padded seat member 50 which extends longitudinally with respect to the body of the snowmobile. The seat 50 is longer than it is wide and it is adapted to be straddled by the legs of the driver. Also, as indicated in the drawings, it is curved slightly so as to be higher at its front end than it is at its rear end.

Figure 2:
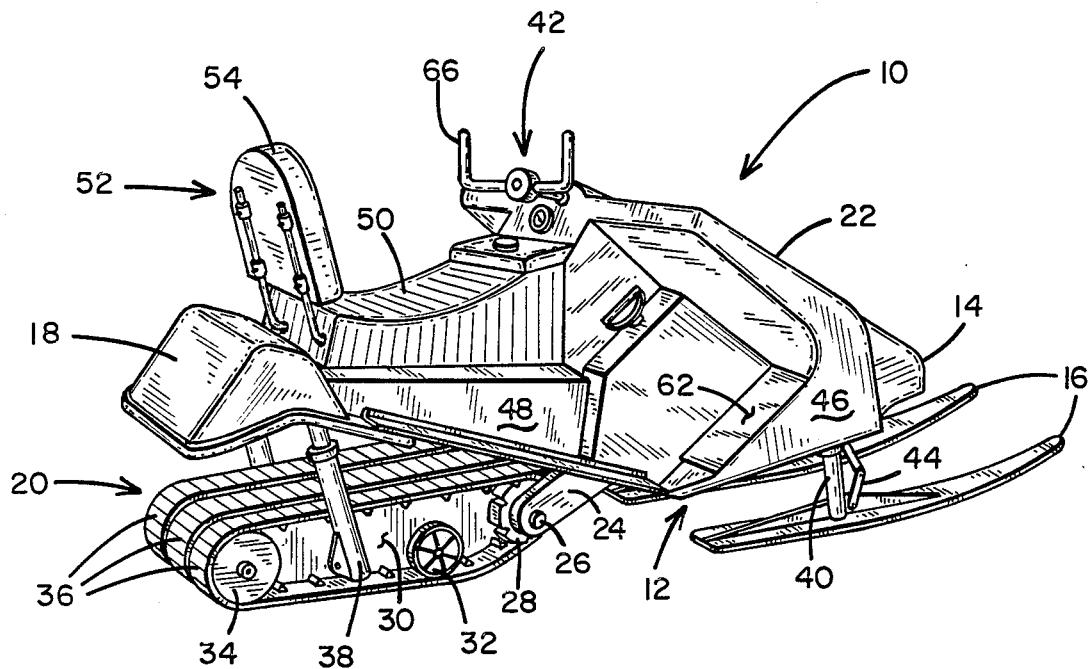
FIG. 2 is a perspective view of the embodiment of FIG. 1.

Completing the seat assembly and distinguishing the snowmobile seat arrangement of the present invention from the prior art is a seat back member 52 which projects upwardly proximate the rear portion of the seat 50 and is inclined somewhat rearwardly therefrom. With reference to FIG. 2, the seat backrest assembly 52 is seen to comprise a padded cushion member 54, which is secured to brackets 56 in such a fashion that it can be raised and lowered relative to those brackets to accommodate drivers of different physical size. In this figure, the L-shaped brackets 56 extend through cylindrical rings 57 attached to the rear surface of the seat back and set screws or other suitable means 58 serve to hold the seat back cushion at a desired elevation. The brackets 56 are adapted to telescopingly fit within generally horizontal tubes (not shown) located beneath the seat cushion 50, and further means are provided for locking the bracket members 56 in a desired longitudinal position. This permits longitudinal adjustment of the seat back member 52 as indicated by the phantom line representation 59 and the arrow symbol 60 in FIG. 1. It is also possible to attach the backrest directly to the rear end of the seat 50 and to mount the seat 50 on guide rails such that the seat and backrest can be moved longitudinally, as a unit, relative to the frame.

A driver sitting upon the seat cushion 50 and with his or her feet resting upon the forward-sloping footrests 62 will assume a somewhat rearwardly inclined disposition, not unlike the position assumed by the rider of a chopper-type motorcycle, with his or her arms outstretched to grasp the steering handles 42. Again, to accommodate operators of different physical size, it may prove expedient to permit some inward and outward adjustment of the steering shaft and steering wheel assembly 42 as indicated by the arrow symbol 64 and the phantom line representation 66.

The seat backrest assembly 58 is preferably adjusted so that it will abut the operator in the lumbar and thoracic region of the back and provide comfortable support while the operator's torso is inclined slightly rearward from the vertical. Human engineering studies conducted to date on a snowmobile vehicle having a seat arrangement in accordance with the present invention has revealed that there is substantially less operator fatigue following long periods of use than with snowmobiles of the prior art seat construction wherein the back of the operator is not supported and wherein the operator is naturally forced to assume a somewhat hunched-over, forward-leaning disposition while operating the vehicle.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A snowmobile body comprising:
   (a) a frame supported by steerable ski means at a forward end thereof and by a motor driven endless track at the rear end thereof;
   (b) a body mounted on said frame, said body including a cowl for enclosing the motor for said motor driven endless track, said cowl including generally forward and upwardly sloping footrest members on each side of said cowl, said footrest members being elevated with respect to the bottom of said frame and totally unobstructed by said cowl on the outer lateral edges of said footrest members;
   (c) a longitudinally extending seat member secured to said body and extending rearward of said cowl for supporting an operator of said snowmobile in a sitting position upon said seat member with his torso naturally tilted rearward when his legs are outstretched and partially straddling opposed side edges of said seat member and his feet are disposed on said elevated footrest members; and
   (d) a seat backrest member attached to said frame and projecting upwardly and inclined rearwardly at a predetermined acute angle with respect to the vertical from the rear end portion of said elongated seat member, said seat backrest member being of a length to support the back of said operator in at least the lumbar and thoracic zones when his torso is rearwardly inclined.

2. The snowmobile body as in claim 1 wherein the upper surface of said elongated seat member slops downwardly from a location proximate the forward end thereof toward said rear end portion thereof.

3. The snowmobile body as in claim 1 and further including means for slidably positioning said seat assembly relative to said frame.

4. The snowmobile body as in claim 1 wherein said seat backrest member is vertically and longitudinally positionable.

* * * * *

UNITED STATES PATENT AND TRADEMARK OFFICE
CERTIFICATE OF CORRECTION

PATENT NO. : 4,779,695

DATED : October 25, 1988

INVENTOR(S) : Toshihiro Yasui

It is certified that error appears in the above-identified patent and that said Letters Patent is hereby corrected as shown below:

Claim 3, Column 4, lines 57 and 58, delete "assembly" and put instead -- member --.

Signed and Sealed this

Twenty-first Day of March, 1989

Attest:

DONALD J. QUIGG

*Attesting Officer*

*Commissioner of Patents and Trademarks*